United States Patent [19]
Hounsfield

[11] 3,924,13[?]
[45] Dec. 2, 197[5]

[54] METHOD OF AND APPARATUS FOR EXAMINING A BODY BY RADIATION SUCH AS X OR GAMMA RADIATION

[75] Inventor: Godfrey Newbold Hounsfield, Newark, England

[73] Assignee: EMI Limited, Hayes, England

[22] Filed: May 9, 1974

[21] Appl. No.: 468,551

Related U.S. Application Data

[60] Division of Ser. No. 349,242, April 9, 1973, which is a continuation-in-part of Ser. No. 212,778, Dec. 27, 1971, Pat. No. 3,778,614, which is a continuation of Ser. No. 861,538, Aug. 21, 1969, abandoned.

[30] Foreign Application Priority Data

Aug. 23, 1968 United Kingdom............ 40317/68

[52] U.S. Cl. ............. 250/360; 250/363; 250/439; 250/445 T
[51] Int. Cl.² ............. G01N 23/00; G01N 23/02; G01N 23/04
[58] Field of Search .......... 250/444, 360, 362, 447, 250/402, 363, 445, 445 T, 439; 178/DIG. 5

[56] References Cited

UNITED STATES PATENTS

3,432,657 3/1969 Slavin ........................ 250/360 ?
3,766,387 10/1973 Heffan et al. ................. 250/36(

*Primary Examiner*—James W. Lawrence
*Assistant Examiner*—T. N. Grigsby
*Attorney, Agent, or Firm*—Fleit & Jacobson

[57] ABSTRACT

Apparatus is disclosed for examining a body by means of penetrating radiation such as X- or γ-radiation. A beam of the radiation is scanned laterally, in a plane relative to the body, and also rotated about an axis perpendicular to said plane. In a preferred example the lateral scanning is bi-directional and the rotation occurs in steps one step being effected during each reversal of the lateral scanning motion.

5 Claims, 25 Drawing Figures

METHOD OF AND APPARATUS FOR EXAMINING A BODY BY RADIATION SUCH AS X OR GAMMA RADIATION

This application is a division of my application Ser. No. 349,242, filed Apr. 9, 1973, which is a continuation-in-part of my application Ser. No. 212,778 filed Dec. 27, 1971, now U.S. Pat. No. 3,778,614, which is a continuation of my application Ser. No. 861,538 filed Aug. 21, 1969 and now abandoned.

This invention relates to apparatus for examining a body by means of radiation such as X or γ radiation.

The apparatus according to the invention can be used to assist in the production of radiographs in any convenient form, such as a picture on a cathode ray tube or other image forming device, a photograph of such a picture, or a map of absorption coefficients such as may be produced by a digital computer and on which "contours" may subsequently be drawn.

In the method of, and apparatus for, examining a body described in my application Ser. No. 212,778, radiation is directed through part of the body, from an external source, in the form of a set of pencil beams or rays toward detector means disposed on the opposite side of the body part to the said source. Each ray is detected after it has passed through the body and the absorption of radiation by contents of the body disposed along the path in the body followed by each ray is determined. The source and detector means are orbited, relative to the body so that radiation is directed, in sets of rays, through a plane of the body from a plurality of different directions. In this way the absorption or transmission coefficients of the elements in a two-dimensional matrix of elements notionally disposed in said plane of the body can be determined, provided sufficient rays are directed through the body.

It is an object of this invention to provide apparatus for examining a body by means of radiation, such as X or γ radiation, in which means are provided for laterally scanning a beam of the radiation across a plane through the body and for rotating said beam relative to the body about an axis perpendicular to said plane.

It is another object of the invention to provide apparatus of the kind described in the last preceding paragraph wherein said lateral scanning is bi-directional and said rotation is effected in steps, one step being effected during each reversal in the lateral scanning motion.

It is a further object of this invention to provide apparatus utilising penetrating radiation such as X- or γ-radiation to evaluate a variable absorption coefficient with respect to said radiation in a plane within a body, including a source of said radiation and detecting means for detecting a beam, radiated from said source, after passage through said body in said plane, said detecting means and said source on the one hand and said body on the other hand being relatively movable so that output signals can be obtained representing the absorption by said body of beams at a plurality of angularly and laterally spaced positions, and means for utilising said output signals to effect said evaluation, said apparatus further comprising a scanning frame on which said source and said detecting means are mounted, facing each other across an aperture in which said body can be positioned so that said beams of radiation pass through said body in said plane, said source and said detecting means being mounted for orbital scanning movement about an axis normal to said plane and also for lateral scanning movement to cause said detecting means to pick up radiation successively from respective beam paths through the body which are disposed across the lateral extent of said body in said plane, and means for producing interrelated orbital and lateral scanning movements of said source and said detecting means in such a way that for each of a series of successive increments of said orbital movement a lateral scanning movement occurs from which there is derived a set of output signals corresponding to the absorption suffered by said radiation on traversing said beam paths, successive sets of such output signals being derived after said successive increments of orbital movement.

In order that the invention may be clearly understood and readily carried into effect, the same will now be described with reference to the accompanying drawings in which:

FIG. 7 illustrates a modification of FIG. 6a, FIG. 8a illustrates, partly in block form, the apparatus embodying the scanning means illustrated in FIG. 7, FIGS. 8b, 8c and 8d are diagrams useful in explaining the operation of parts of the apparatus shown in FIG. 8a, FIGS. 9a, 9b, 9c and 9d illustrate the application of weighting factors to elements of the picture.

Figure 1:
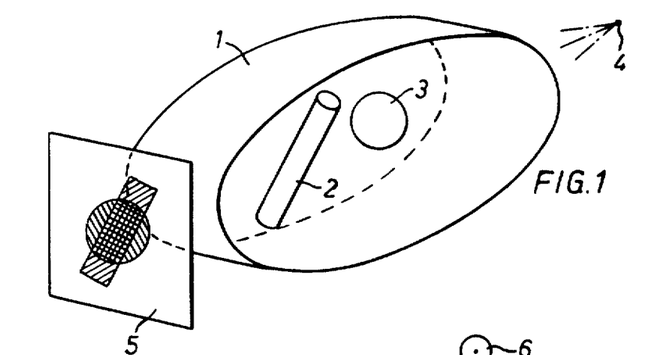
FIG. 1 shows the kind of picture produced by conventional X-ray apparatus.
Figure 2A:
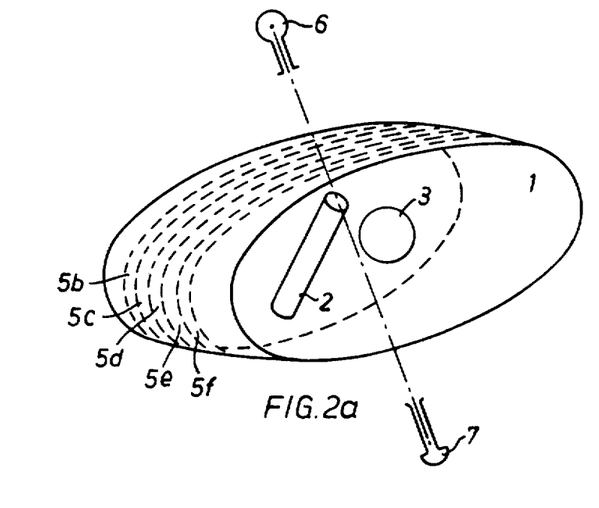
FIGS. 2a, 2b, 2c, 2d, 2e and 2f illustrate the principle of the technique utilised in my aforementioned application Ser. No. 212,778.
Figure 2B:
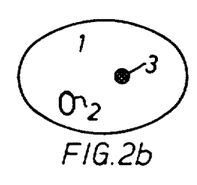
Figure 2C:
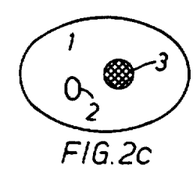
Figure 2D:
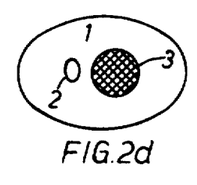
Figure 2E:
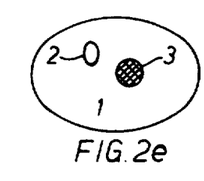
Figure 2F:
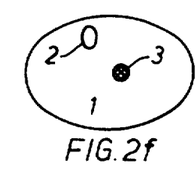

Referring to FIG. 1, this shows a body 1 containing a bone 2 and a tumour 3. Also shown are a source of X-rays 4 and an X-ray film 5. As can be seen, images of the bone and tumour are produced on the film, but partly superimposed. The tone of any point on the film is dependent on the product of the coefficients of transmission of all the elements lying between that point and the X-ray source. Thus if the bone 2 has the lowest coefficient of transmission, the tumour 3 the second lowest and the surrounding material the highest, the X-ray image comprises a dark patch where the bone and tumour are superimposed, a lighter patch due to the bone not superimposed on the tumour and a still lighter patch due to the tumour not superimposed on the bone. These are surrounded by a light area where neither bone nor tumour is present. Also as the differences between the co-efficients of transmission of tumour and normal tissue are small, the differences in tone between the different parts of the X-ray picture are slight and difficult to detect using such a method.

Figure 3:
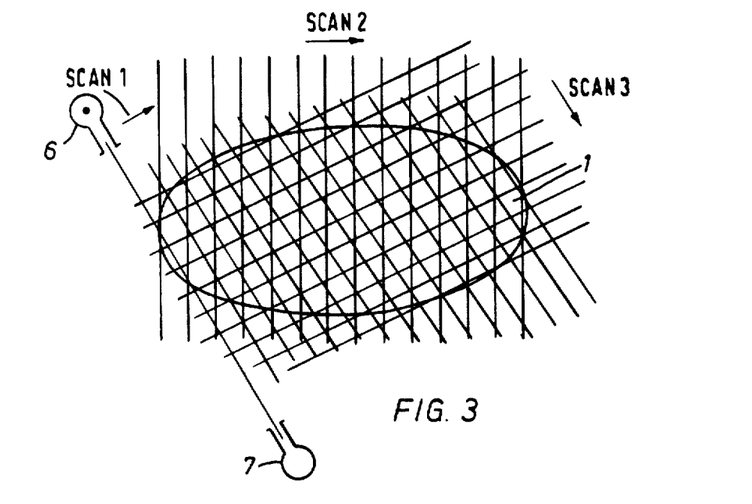
FIG. 3 shows one method of scanning used in said technique.

Referring now to FIG. 2, the body, bone and tumour are denoted by the same references as in FIG. 1. The X-ray source is replaced by a source 6 which may alternatively be of gamma rays but is preferably of X-rays. It differs from source 4 in that it produces a beam of small cross section area or a ray as it might also be called, for example 3 m.m square or diameter, and preferably includes a collimator to reduce scatter of the rays. The X-ray film 5 has been replaced by a detector 7, which may be a scintillator and a scintillation counter and which preferably also includes a collimator. The body 1 is scanned by the beam in one plane only, the plane being 3 m.m thick in this example, in a direction not only linearly across the plane, but at a plurality of angles round the plane, the detector 7 being so mounted that it is always pointing towards the source 6. FIG. 3 illustrates the scanning in more detail. If only a single scan across the plane were preformed, the result would merely be equivalent to a conventional X-ray picture of that plane, all the objects on a line between source 6 and detector 7 being superimposed. However by performing a large number of scans, sufficient information can be derived to enable the coefficient of absorption of the material in each 3 m.m cube of material in the plane to be calculated and the co-ordinates of its position in the plane determined. Although only three scans are shown in FIG. 3 it will be appreciated that many more would be required in practice.

In each position of the beam the detector 7 determines the transmission of the X radiation by a path of relatively small cross-sectional area through the body. The plane under examination is regarded as a two dimensional matrix of elements and the directions and numbers of the paths is such that each element of the matrix is intersected by a group of paths, which paths intersect different groups of elements.

From the transmissions by all the paths, a series of simultaneous equations is built up represented by the discrete output signals, derived from the radiation traversing all the respective paths and by means of a digital computer provides the absorption coefficient of each element of the matrix. The outputs of the computer may be used to produce a picture or other representation of the section in any convenient form. Successive parallel planes may be examined in this way, and a picture of each planar slice produced to build up a picture of the entire body or a larger section of it. The slices may be examined in sequence or simultaneously by using a number of X-ray sources and detectors in parallel. FIGS. 2b to 2f show the pictures resulting from examination of planar slices 5b to 5f of body 1.

Figure 4:
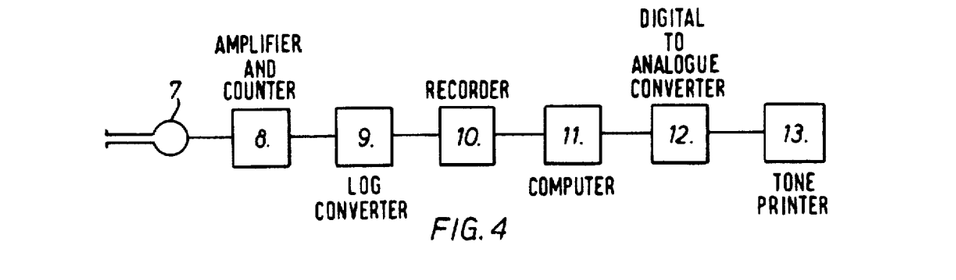
FIG. 4 shows in block form suitable apparatus for carrying out said technique.

FIG. 4 shows a block diagram of the apparatus for producing pictures from the outputs from detector 7. The output from detector 7 is applied to an amplifier and counter 8 which produces a digital output representing the number of counts in each reading. The output from 8 is converted to logarithmic form in a logarithmic converter 9 whose output is stored in a punched-tape of magnetic tape recorder 10 before being transmitted to a digital computer 11 for processing. The computer 11 produces for each 3 m.m cube of a planar slice of body i a digital number representing the absorption coefficient of the material within that cube. These digital numbers may be converted to analogue form in digital-to-analogue converter 12 and applied to a tone printer 13 to produce a picture. Alternatively, the computer outputs may be retained in digital form for comparison by pattern recognition techniques, with other digitised pictures.

To achieve the required result, the absorption along each path is deduced from the transmission by each path and a knowledge of the initial intensity of the beam or ray entering each path. The logarithmic converter 9 is used to provide a linear output so that the total absorption along a path is equal to the sum of the absorption in each small element along the path. Let 100 parallel paths be used for each of 400 directions spaced equally over 180°. The computer 11 has then 40,000 figures to process, each representing the total absorption along a given path. Consider the section divided into 100 × 100 similar meshes as on Cartesian graph paper. Each mesh represents an element of the body, but the term mesh will be used in the following mathematical consideration for convenience. The computer 11 is then programmed to give the absorption for each of the 10,000 meshes.

Consider a ray which passes through a set of $n = 100$ meshes through none of which a ray has previously passed. Let the total absorption be Z dB. The computer then allocates a provisional value of Z/100 to each of the meshes. Now suppose that, at a later stage, a ray passes through another set of 100 meshes the absorption in some or all of these meshes having already been allocated. Let the sum of the figures already allocated by $Z_1$ whereas the new measurement gives a total absorption $Z_2$. It will be appreciated that $Z_1$ constitutes a reconstruction of the output signal $Z_2$ derived from the last approximations to the absorptions of the respective meshes. Then a correction $(Z_2 - Z_1)/100$ is added to the figures already appearing in each of the meshes. This process is then continued for all the 40,000 rays. This process gives a rough approximation, but to obtain better accuracy, the computer must repeat it a number of times, say five. say Consider a single section of the body in the xy-plane in which the absorption per unit distance in dB at the point x, y is z.

Let
$$z = f(x,y)$$

Now consider a single set of rays all parallel to the y-axis and spaced equally by intervals $\Delta x$. The rays are arranged to have a width rather greater than $\Delta x$ so that some overlapping occurs. The optimum beam width is determined empirically. For mathematical purposes it is assumed that the change of absorption through any interval $\Delta x$ is negligible. We now suppose that the section of the body to be examined is bounded on two sides by the x- and y-axes and is square in shape so that it can be divided into M elementary squares with edges parallel to the axes.

The complete total of rays can be divided into sets each of which consists of parallel rays or effectively parallel rays at a given angle or mean angle. The sets of discrete output signals derived from the rays in each set are treated in the computer in sequence. However, since there are only about 100 × 100 meshes and about 400 angles are employed within 180°, rays at neighbouring angles must include some of the same squares and their absorption will not, therefore, be independent. If the sets were therefore taken in angular succession the lack of independence would clearly lead to a slower convergence than if they were independent.

The computer is therefore arranged, by programming, to take the different angular subsets in a pseudo random order with large angular gaps, of say 40°, between successive sets of rays. The sequence is intended to ensure that every angle is included, but not repeated, within the 400 directions. Rays close together in angle then appear far part in the computer scanning sequence.

The accuracy of detection by detectors such as 7 is limited so that the raw data contain errors and therefore, as the complete cycle of 100 × 400 measurements is analysed 4 or 5 times by the computer, the resultant figures for the meshes tend to oscillate. It has been found that this can be avoided by multiplying the later corrections by a factor which is less than unity and falls steadily for successive cycles.

The procedure may be represented mathematically as follows. The true continuous distribution function is given by equation (1)
$$z = f(x,y) \tag{1}$$
Let the distribution function reached at some stage of the work be
$$z' = g(x,y) \tag{2}$$
which is a discontinuous function since $z'$ must have the same value over each mesh.

Now consider an arbitrary ray passing through $n$ meshes. If $z_r$ is the means value of $z$ through the $r$ th mesh and Z is the total absorption (or attenuation) of the ray in dB as measured $$Z = \sum_{1}^{n} z_r \tag{3}$$

The value of $z'$ for each mesh will also be known from the previous work. If no ray has passed through a given mesh $z'$ is put equal to zero.

The mean square error for all the meshes along the path of the ray will be written E where $$n E = \sum_{1}^{n} (z_r' - z_r)^2 \tag{4}$$

and it is required to choose new values $z_r''$ to replace $z_r'$ in order to minimise $E$.

There is no reason to favour one mesh rather than another, and therefore a constant C is added to $z_r'$ where C is independent of $r$ and must be obtained from the additional information provided by Z. Hence
$$z_r'' = z_r' + C \tag{5}$$
Hence the new value of $n$ E will be $$n E = \sum_{1}^{n} (z_r'' - z_r)^2 = \sum_{1}^{n} (z_r' - z_r + C)^2 \tag{6}$$

The minimum value of $E$ is obtained where $C$ is equal to the mean value of $z_r - z_r'$ or $$C = \frac{\sum_{1}^{n} (z_r - z_r')}{n} = Z/n - \frac{\sum_{1}^{n} z_r'}{n} \tag{7}$$

Hence $$z_r'' = z_r' + Z/n - \frac{\sum_{1}^{n} z_r'}{n} \tag{8}$$

In other words the correction applied is equal to the mean value of the error. If none of the $n$ meshes has previously appeared all the $z_r'$ are put equal to zero so that
$$z_r'' = Z/n \tag{9}$$
In other words the attenuation is, at first, uniformly distributed among the meshes.

For the $s$th ray equation (8) becomes $$z_{rs}'' = z_{rs}' + Z_s/n - \frac{\sum_{r=1}^{n} z_{rs}'}{n} \tag{10}$$

If there is a total of S rays there will be a total of S equations for a complete cycle. If $m$ is the number of rays in a set of parallel rays and N is the number of angles
$$S = m N \tag{11}$$
If $q$ is the number of complete cycles used by the computer, the total number of ray operations is $q\ S$.

Since the number of rays $S$ per cycle is several times the number of meshes M, the number $S$ of equations will be several times the number M of independent equations.

Difficulties arise in finding a system which traces through the picture matrix an equivalent beam or ray as it has been called heretofore which has effectively constant width, and which also includes the correct number of picture elements along its length. Both of these requirements are essential for the accurate computer calculations which are to follow.

Figure 9A:
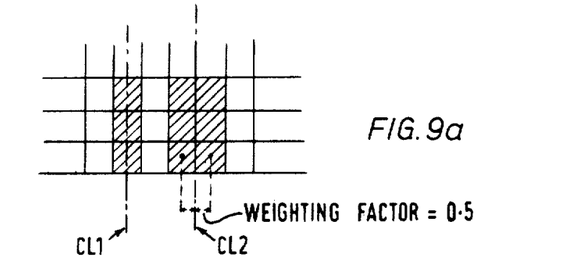

The two worst cases are shown in FIG. 9a, where in one case a beam centre line CL1 passes through the squares of the matrix perpendicularly and the centre line of the beam passes through the centre of the squares, in the other case the beam centre line CL2 passes between the squares. The latter case would add up to twice as many squares as the former, when the squares along the length of the beam are added up, and would clearly give an error of 2:1.

In order to overcome the above problem the values in each square are multiplied by a weighting factor which is a function of the distance from the centre of the square to the centre line of the beam, i.e., the squares of beam 2 in FIG. 9a would have a weighting factor of 0.5, the resulting sum of the numbers in the two beams then being equal.

Figure 9B:
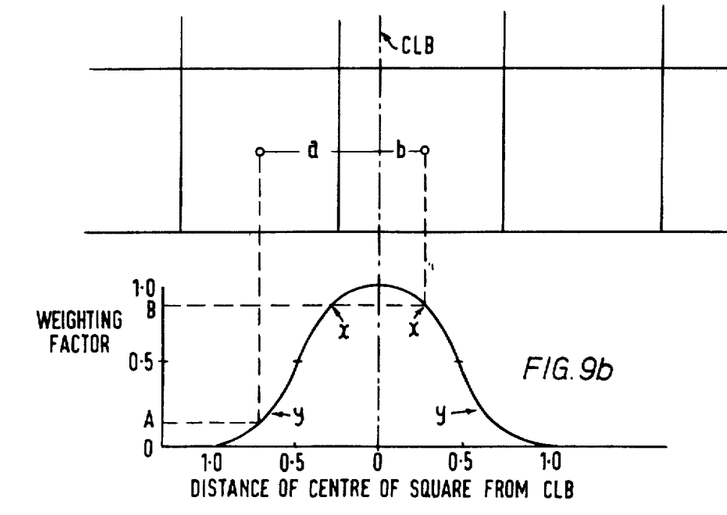

FIG. 9b shows an intermediate position of the beam in which the distances from the centre line CLB of the beam to the centres of the two affected squares in the beam are $a$ and $b$ respectively. The corresponding weighting factors A and B can be read off the graph, and when these are added together they must for reasons indicated above add up to unity. Therefore it follows that the parts of the curves labelled $x$ must be drawn the inverse of the parts labelled $y$, if the beam and hence the weighting curve is to be considered symmetrical about its centre line.

Figure 9C:
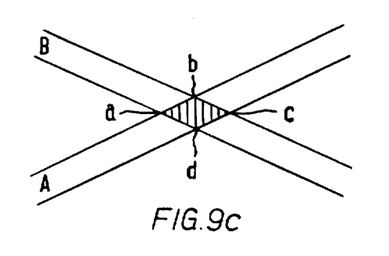
Figure 9D:
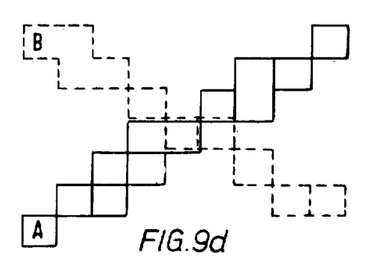

It can be shown that one requirement for accurate summation of values of the matrix squares is idealised in FIG. 9c and its practical equivalent is shown in FIG. 9d using a matrix with a beam at the same angle.

In FIG. 9c the area $abcd$ is obviously constant at any position of the intersection of the beams and is a function of the angle of intersection of the two beams A and B. In FIG. 9d the two equivalent beams vary in width from one to two squares and a constant area at intersection would be impossible without the use of weighting factors. It can be shown that for a given X-ray beam width there is one weighting curve which fulfils all the requirements. For example, if the squares contained at the intersection of the beams in FIG. 9d are multiplied by their respective weighting factors taken from this curve, they will produce a sum which is proportional to the area abcd in FIG. 9c. Any angle of intersection may be chosen and the beam in FIG. 9d may be intersected anywhere along its length for this condition to remain true.

The weighting factor curve can be split up into a table of approximately 20 values to which the computer can refer during calculations without substantially impairing the accuracy of the system.

In the example illustrated in FIG. 3 only a single detector 7 is indicated. If however a fan-shaped or strip beam of radiation is used, with a group of detectors each for receiving radiation transmitted by one of the paths of small cross sectional area, some correction may have to be made in solving the equations for the effect of Compton scatter but in many cases this can be avoided by adequate spacing of the detectors.

As was previously mentioned, the differences in absorption between different materials is very small. However, in accordance with the invention the contrast of the picture produced can be so arranged that the full black to white range represents only the small range of absorption values which is of interest.

Figure 5:
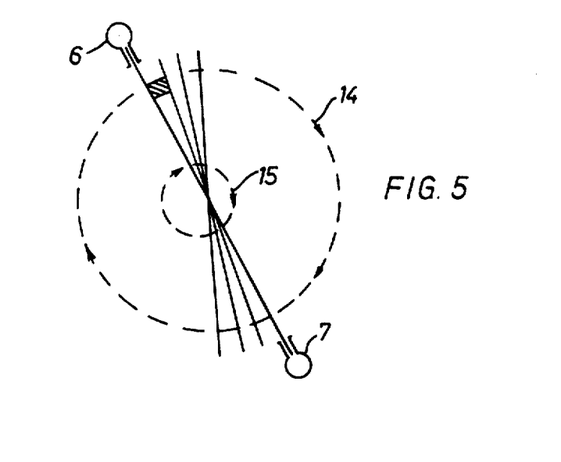
FIG. 5 shows an alternative method of scanning.

It is essential in all X-ray apparatus to ensure that the patient does not receive an overdose of radiation. In this respect the use of a scintillator and a scintillation counter is advantageous as its efficiency and accuracy in detecting X-rays are several orders better than those of photographic film. The maximum detail obtainable in a picture is a function of the number of counts per reading received by the scintillation counter around the edge of the body. In view of the limitation on the permissible number of counts per reading, it would not be feasible to produce a picture having the same order of definition as a television picture when examining a living body, although a high definition picture of an inanimate object could be produced. Moreover, in examining living bodies, it is not normally necessary to have a high definition picture of the whole body. Apparatus according to the invention can be used to produce a picture which is of high definition in the area of immediate interest and of low definition in surrounding areas. For example, as shown in FIG. 5 the radiation source 6 and detector 7 may be arranged to perform a circular scan indicated by the arrow 15 round the edges of the body, which is so positioned that the area of interest is near the centre of the scan. By averaging the number of counts over a small angle of rotation, mean values of absorption for areas enclosed by the angle such as the area shown shaded, may be calculated. It is clear from FIG. 5 that near the edges of the body only a relatively small number of large area elements are being examined, whereas at the centre a large number of small area elements is examined. Consequently the resulting picture will have a high definition near the centre and a low definition towards the edges. In producing the picture, the points may conveniently be plotted in polar co-ordinates. As in the example of FIG. 3, a large number of scans is required to produce sufficient information. In the embodiment of FIG. 5, the additional scans may be produced by superimposing a slower rotary motion which shifts the axis of the main rotation so that the centre of the circle of the main scanning motion traces a circle of small diameter. This additional scanning motion produces the intersecting paths for each element of the matrix according to which the body is examined. The superimposed motion need not be circular and need not be confined to the centre circle. For example it could be a spiral starting at the edge of the outer circle progressing rapidly towards the centre then performing a slow spiral in the region of the centre. It may be more complicated provided that it achieves the object of even coverage at the centre.

Figure 6A:
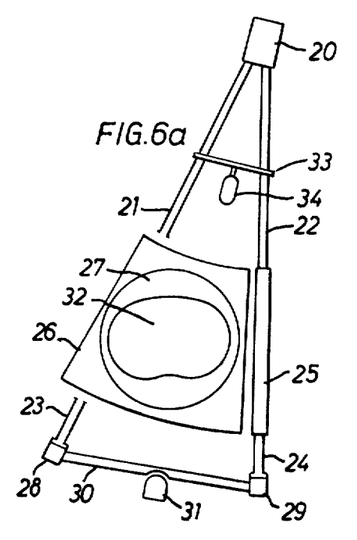
FIGS. 6a and 6b illustrate diagrammatically the construction of the scanning means of apparatus according to two other examples of said technique, and show, in outline form, an example of the present invention.

Referring to FIG. 6a of the drawing there is represented therein an X-ray tube 20 from which the rays, when the tube is operating, pass through two collimators 21 and 22. The collimator 21 is aligned with a further collimator 23 and the collimator 22 is aligned with a further collimator 24. Between collimator 22 and 24 is located a dummy attenuator 25. There is a gap between the collimators 21 and 23 for the location of the object to be X-rayed and in the example illustrated this gap is occupied by a plastics block 26 having a central aperture 27 for the body to be X-rayed. Two scintillators 28 and 29 are located at the ends of the collimators 23 and 24 respectively and these communicate via a light pipe 30 with a photomultiplier 31. A chopper 33 rotatable by an electric motor 34 is arranged to allow beams to pass through the collimators 21 and 22 only alternately to produce scintillations in the scintillators 28 and 29 for detection by the photo-multiplier 31. When the apparatus is in use, the collimators 21 to 24, the attenuator 25, the scintillators 28 and 29, the light pipe 30 the photomultiplier 31, the chopper 33 and the motor 34 are oscillated through the angle subtended by the block 26. The X-ray source 20 does not take part in this oscillation because it produces a beam wide enough to span the block 26. However the whole equipment is arranged to rotate slowly about the body to be examined by X radiation. Such a body is represented by the outline 32.

Figure 6B:
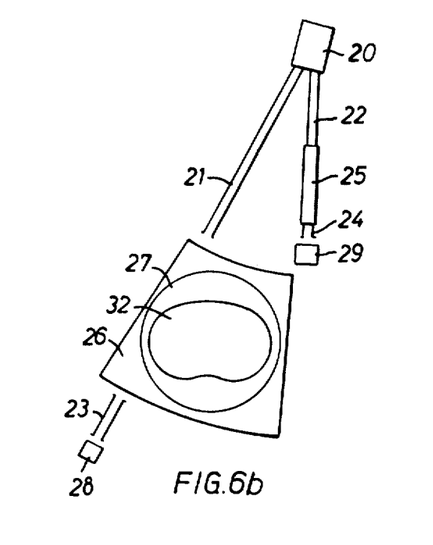

The use of the scintillator 29 and the attenuator 25 provides a reference for photo-multiplier photomultiplier 31. The material of the attenuator 25 is selected to have similar absorption properties to the body 32 to be examined so that accurate transmission readings may be obtained from the X radiations which pass through this body substantially independent of the X-ray source intensity. The material in the dummy attenuator 25 compensates, to some extent, for the X-ray tube spectrum drift. The space 27 between the body and block 26 is filled with a bag containing water so that the beam intensity received by the scintillator 28 is kept as constant as possible as it traverses the body 32, thus reducing the range of the readings which the photo-multiplier 31 has to handle. The apparatus may be calibrated initially by inserting a round homogeneous body in the aperture of the block 26. FIG. 6b is a similar system but the chopper is discarded and two separate detectors are used for measuring the sources and readings through the body.

Figure 7:
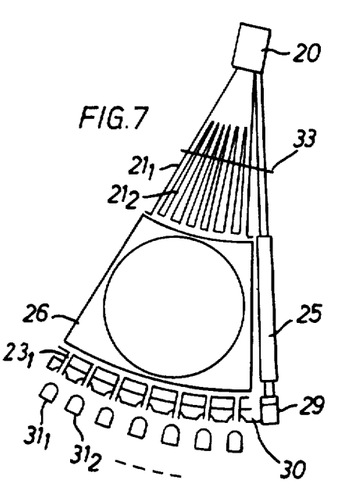
Figure 8A:
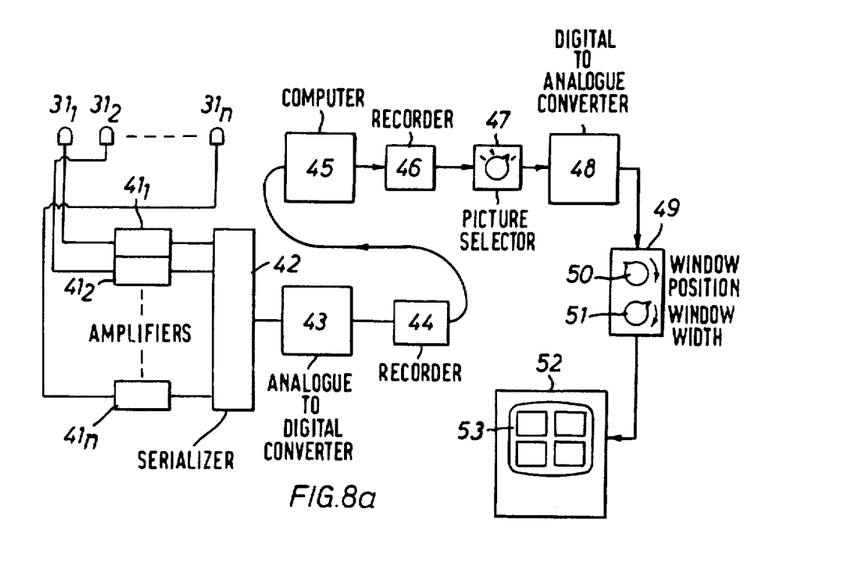
Figure 8B:
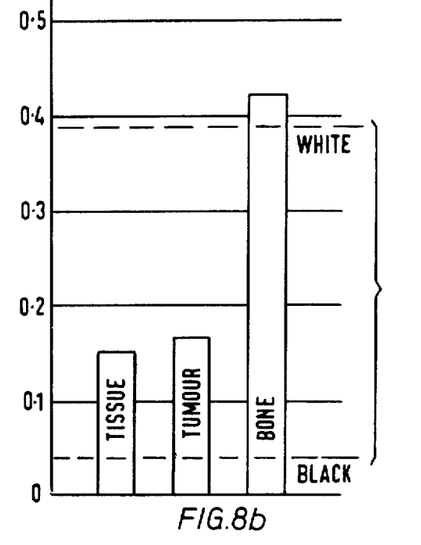
Figure 8C:
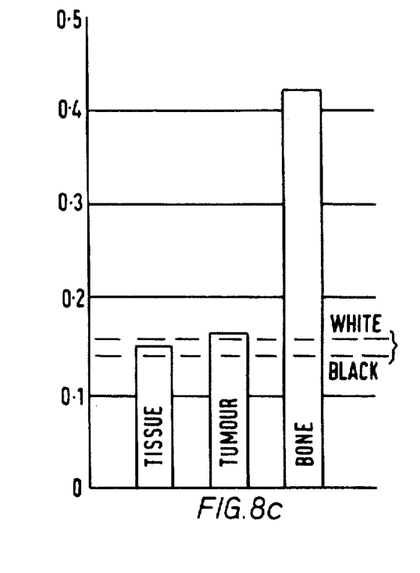
Figure 8D:
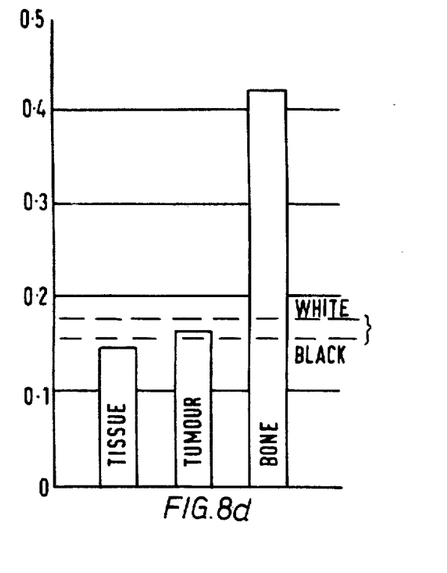

The modification of FIG. 6a which is illustrated in FIG. 7 is intended to reduce the time required to complete an examination. According to FIG. 7 a series of photo-multipliers $31_1$, $31_2$ are used instead of the single photo-multiplier 31 of FIG. 6. The photo-multipliers have a common reference scintillator 29 and light pipe 30. Each photo-multiplier has individual collimators between it and the source of X-rays 20, the collimators being denoted by the references $21_1$ and $23_1$ in the case of the photo-multiplier $31_1$. With this form of the invention the oscillation of the photo-multipliers and the associated collimating systems need be only a fraction of that of the apparatus shown in FIG. 6a. The photo-multipliers could also be arranged slightly displaced downwards so that six pictures can be taken at one time. As indicated, in FIG. 8a the outputs of the photo-multipliers $31_1$, $31_2$ are applied to a series of amplifiers $41_1$, $41_2$ . . . and thence to a serialiser 42 which feeds the plurality outputs of the amplifiers in series to an analogue-to-digital converter 43. The digital output of the converter 43 is fed to a magnetic tape recorder 44 and thence to a digital computer 45 which is programmed to compute the absorption coefficients of the elements of a matrix notionally superimposed on the body 32 under examination. The co-efficients computed by the computer 45 are recorded by a further magnetic tape recorder 46 from which they are applied to a picture selector control device 47. The tape produced by the computer 45 may be replaced on the tape recorder 44, recorder 46 then being unnecessary. The output of device 47 is applied to a digital-to-analogue converter 48 and thence to a control circuit 49 which has a manual knob 50 for controlling the position of the contrast window and another manual knob 51 for controlling the width of the window. The output of the control circuit 49 is fed to a display unit 52 which includes a cathode ray tube having a screen 53. The display unit 52 is arranged to respond to the output signals of the digital computer to build up a visual representation of the section of the object under examination. The term "window" denotes the range of signal amplitudes which is applied to the unit 52 to form the display, and the unit 52 is thus such that different absorption coefficients can be displayed on a scale from black to white. The contrast window width control knob 51 enables the full scale black to white to be occupied by a small or large critical range of absorption coefficients, and the observer may vary the position of the window by manipulation of the control knob 50. FIGS. 8b, 8c and 8d illustrate the effect of varying the width and position of the window. The values of the absorption coefficients are indicated on the vertical scale in these Figures. FIG. 8b illustrates the case in which a wide window is used, that is to say in which the black/white range covers a wide range of values of absorption coefficients. If signals exceeding peak white are removed, for example by limiting, only tissue and tumour will show on the picture. However, as the absorption coefficient of tumour is only 10% greater than that of tissue both will appear as grey and it will be difficult to distinguish between them. FIG. 8c shows the effect of using a narrow window. In this case it is not possible to distinguish between bone and tumour but it is easy to distinguish tissue from both bone and tumour. If signals exceeding peak white are removed, only tissue will shown up in the picture.

FIG. 8d shows the effect of altering the position of the narrow window used in FIG. 8c. The tumour now appears as grey while tissue exceeds peak black and bone exceeds peak white. Consequently if signals exceeding peak white and peak black are removed, only the tumour will show up in the picture. It can therefore be seen that by manipulation of the width control knob 51 and position control knob 50 the operator can eliminate from the final picture everything except the material which he wishes to examine. The display unit may also include means for displaying up to four representations of different sections at one time and provision may be made to enable the observer to dwell on one representation. A long after glow tube may be used the picture being replenished by a continuous backwards and forwards pass of the tape deck. The digital computer 45 may be an on line computer and may be remote from the magnetic tape recorders 44 and 46 being connected thereto by suitable lines or the like. Alternatively the magnetic tape recorders may be arranged to store information for computation and display at desired times.

In some cases it may be more convenient to have a direct display. This could employ a cathode ray tube store for storing the data in analogue form. Preferably, the tube should have large values of screen capacity so that the stored information may be interrogated without causing any significant change in its value. Such tubes are commonly used to provide "bright" radar displays. The summation and computing of values received from the cathode ray tube may be carried out by a simple accumulator and comparator operating a serial mode, and the output fed back to the cathode ray tube to give the necessary small addition to the charge built up over the screen. A digital computer would therefore be unnecessary.

In the examples which have been described, the detecting means detect the transmission of radiation through a plurality of paths which are parallel to the slice being examined. In some cases however some at least of the paths may be oblique to the slice and such oblique paths used to determine the transmission or absorption coefficients of the elements of a three dimensional matrix.

Figure 10:
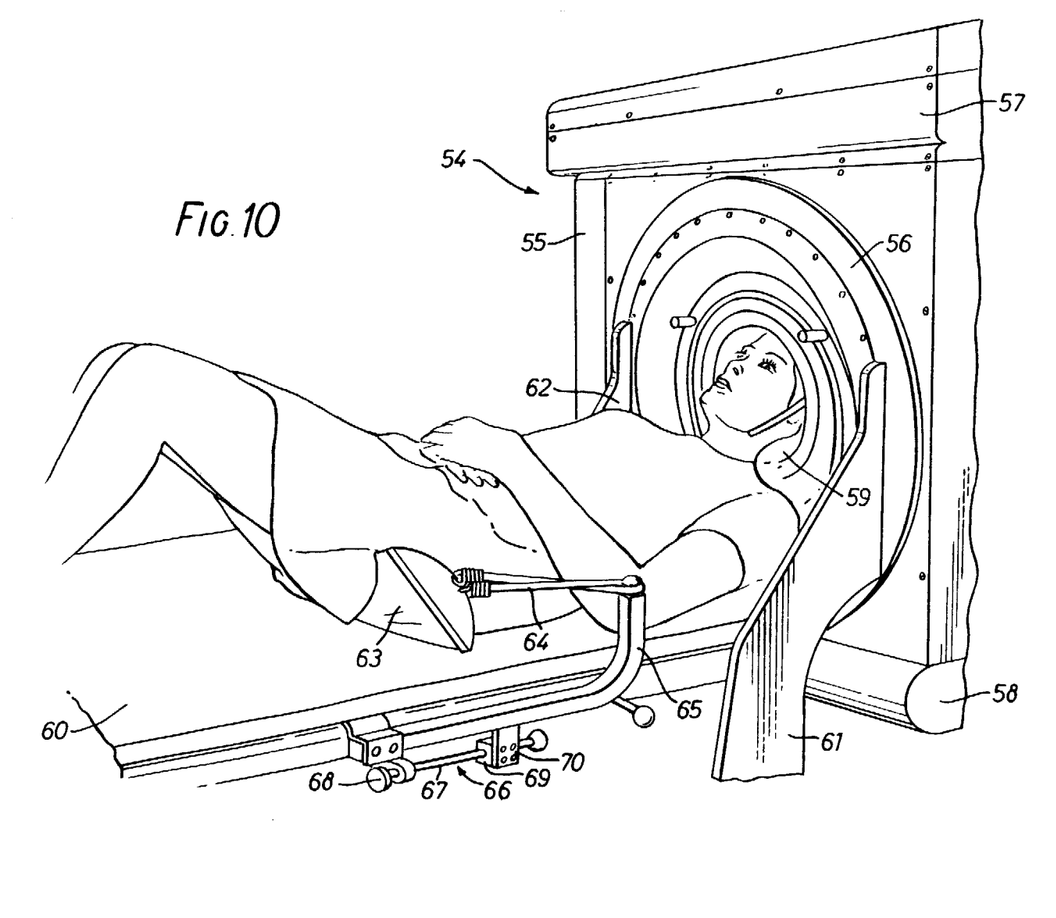
FIG. 10 shows, in perspective view, part of an apparatus in accordance with another example of my present invention and, FIG. 11 is a diagramatic elevational view taken from the rear of the apparatus.

Referring now to FIG. 10, apparatus for examining a body by means of radiation such as X or γ radiation is shown generally at 54. An apertured outer casing 55 is adapted to rotate in steps of about 1° around a fixed, apertured inner casing 56. The outer casing 55 contains a linear channel, enclosed within a housing 57, in which a source of X or γ rays is located, and means (see FIG. 11) for causing the source to move to and fro linearly along the channel. A second linear channel is enclosed within a housing 58, which is integral with the outer casing 55, and a detector such as a scintillator crystal is disposed within the housing 58 and adapted to move to and fro linearly along the second channel in synchronism with the motion of said source along the first mentioned channel. The detector is optically coupled to a photo multiplier.

Figure 11:
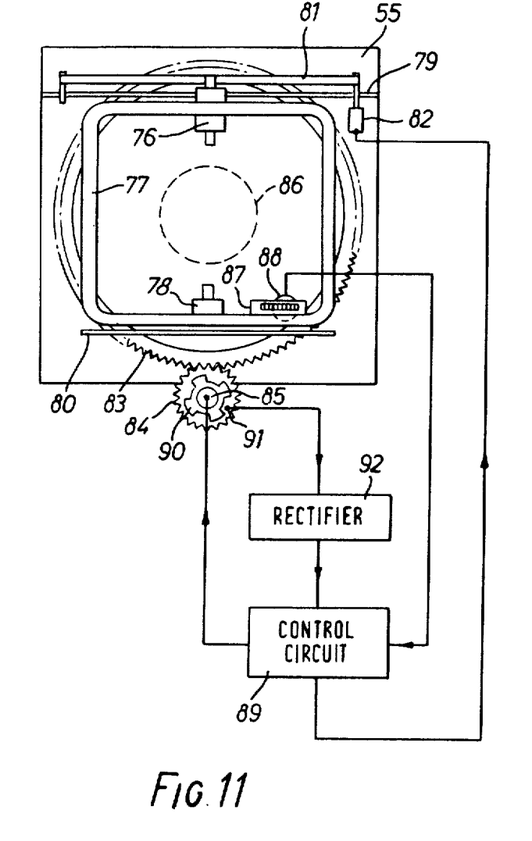

Referring now to FIG. 11, which represents a diagrammatic elevational view taken from the rear of the apparatus, a source 76 of a collimated beam of X or γ rays is fixedly mounted upon a rectangular yoke 77. A detector 78 is mounted on a limb of the said yoke so as to be located opposite the source 76 and the yoke 77 is linearly moveable to and fro on runners such as 79 and 80. The source 76 is clamped to a toothed belt 81 which is driven parallel to the runners 79 and 80 by means of an electrical motor 82.

The casing 55 carries a toothed gear wheel 83 which is driven, via a co-operating gear wheel 84, by a second electrical motor 85. Thus it will be evident that motor 82 causes the source and detector to traverse linearly across the region of interest (represented by the dotted circle 86) and that motor 85 causes the casing 55 and the components supported thereby to orbit about the centre of the circle 86.

The two motions are synchronised electrically by means of photo-electric cells as follows. Yoke 77 carries a transparent band 87 which is provided with a series of opaque strips thereon. The band 87 is interposed between a light source (not shown) and a photoelectric cell 88, the source and the cell being mounted on the casing 55 but being stationary relative to the yoke 77. When the yoke 77 is driven linearly (say from right to left in FIG. 11) the band 87 moves relative to the light source and the cell 88, thus causing interruptions of the light energy incident on cell 88. The cell 88 thus produces a pulsed output signal and this is fed to a motor control circuit 89 wherein counter means is provided for counting the pulses. When the counter means, (which may comprise an integrating circuit adapted to provide an output signal when the integrated signal exceeds a threshold level) detects that the yoke is adjacent the leftwards extremity of its travel, it produces a signal to stop the motor 82 and start the motor 85. The shaft of motor 85 bears a shutter member 90 which has alternate equiangular sectors of differing radial extent and which is interposed between a light source (not shown) and a photoelectric cell 91. When the cell 91 provides an output signal pulse indicative of a change in illumination thereon (either from dark to light or vice-versa) the pulse is fed to the motor control circuit 89 via a rectifying circuit 92. The pulse causes the control circuit to stop motor 85 and start motor 82; the latter being caused to run in the opposite direction to that in which it ran previously so as to cause the yoke 77 to traverse from left to right as viewed in FIG. 11. When the pulses from cell 88 indicate that the yoke is adjacent the rightwards extremity of its travel, the control circuit 89 stops motor 82 and starts motor 85 which runs until the photocell 91 provides a pulse indicative of a change of illumination. The motor 85 is then stopped and the motor 82 re-started in reverse to cause the yoke 77 to traverse from right to left. This procedure continues until the casing 55 has rotated through at least 180° about the centre of the circle 86.

Referring again to FIG. 10, behind the inner casing 56 there is provided a reservoir (see FIGS. 12 and 13) which is adapted to contain water and (see FIG. 12) a reversible pump 93 which communicates via a pipe 94 with a reservoir (not shown) is provided for pumping water into and out of said reservoir. The aperture in said inner casing 56 is closed by a resilient, waterproof member in the form of a bag or "hat" 59 which is re-entrant into the reservoir and forms part of the front wall of said reservoir. The head of a patient is inserted into the member 59 as shown in FIG. 10 and is supported by means of a support member (see FIG. 12).

In order to enable the patient's head to be inserted into the member 9, some of the water in the reservoir is pumped out, thus causing the diameter of the member 59 to expand. The patient's head is then inserted and the member 59 is pulled into position over the patient's head. For this purpose the member 59 may be formed with peripheral flanges or the like. The position of the patient is adjusted until the aforementioned plane over which the radiation is scanned coincides with the plane in the patient's head which it is desired to examine. This having been done, water is pumped into the reservoir which causes the member 59 to collapse, thus making intimate contact with the patient's head, at least in the region thereof which is to be irradiated, in order to reduce as far as possible the entrapment of air in said region between the member 59 and the patient's head. This expedient reduces the discontinuities in absorption encountered by the radiation in the region of the patient's skull, it having been found undesirable for the radiation to pass directly through air into the patient's skull.

The patient is supported supine on a couch 60 which is supported, by means such as legs 61 and 62, from the fixed inner casing 56. In order that the patient may be firmly positioned throughout the period of irradiation, a force is applied which tends to urge the patient's head into the aperture in casing 56 to counteract the outward force exterted by the pressure of the water on top of the patient's head. This is achieved in the present apparatus by means of a sling 63 which passes under the patient's seat. The sling is secured by flexible members such as 64 (one on either side of the couch) to support prongs such as 65 which are slidably mounted by means of a mechanism 66 to respective sides of the couch. The position of the prongs can be adjusted by rotating a rod 67 by means of a knurled knob 68, the rod 67 being screw threaded and adapted to rotate in screw-threaded casing 69 which is fixed to the couch by means of a bracket 70. Means (not shown) can also be provided for tilting the couch by raising or lowering the foot thereof.

Figure 12:
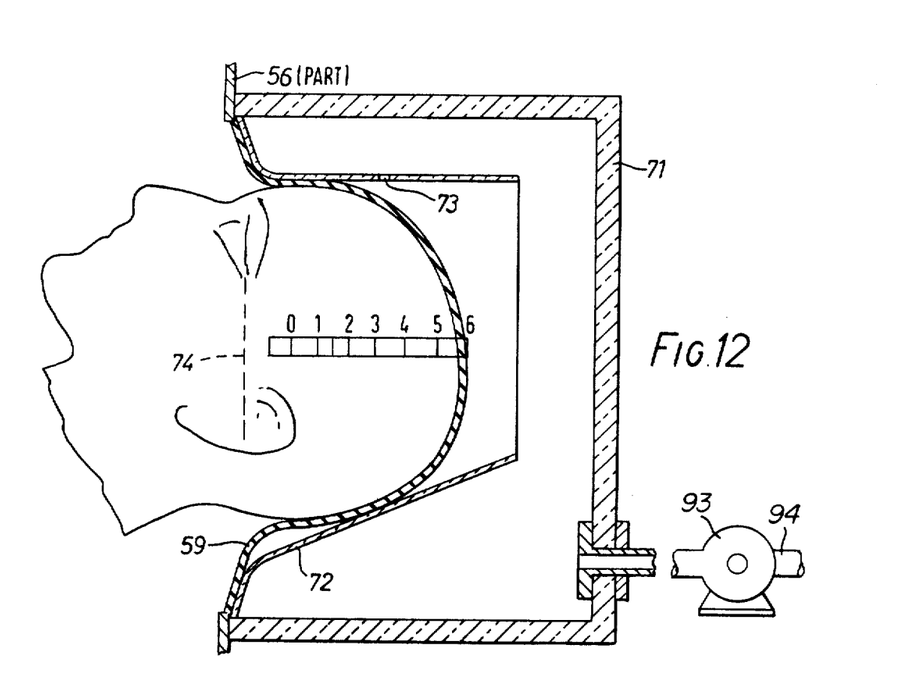
FIGS. 12 and 13 show cross-sectional views through part of the apparatus according to said example of my invention.
Figure 13:
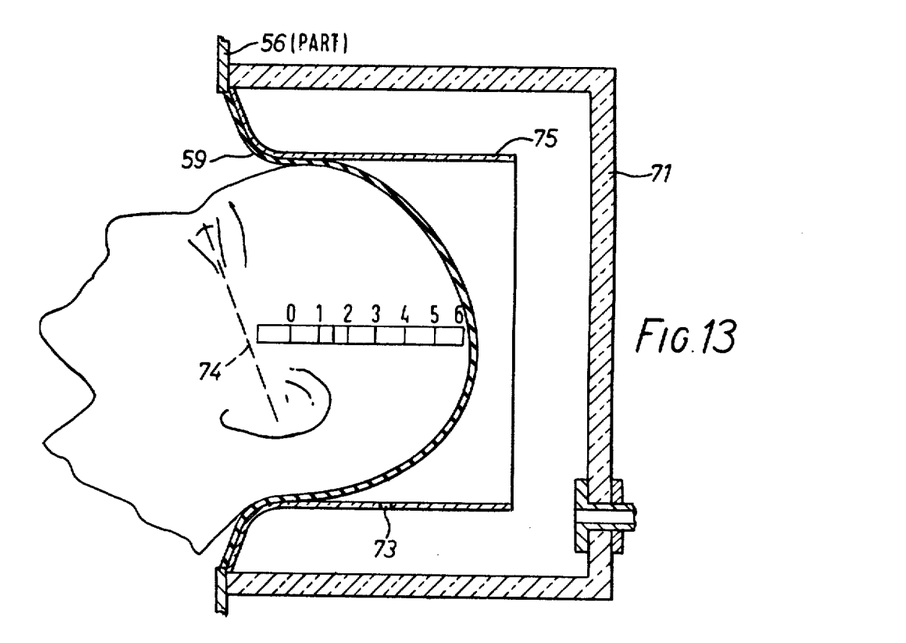

FIGS. 12 and 13 represent cross-sectional views through the aforementioned water reservoir, the head support and the member 59; the head of a patient being shown in each case to illustrate how the head can be supported at different angles to enable different planes therein to be investigated.

In FIG. 12, the reservoir is indicated by the reference numeral 71. As has been mentioned previously, the reservoir 71 is suitably constructed of the material known by the Registered Trade Mark "Perspex". The reservoir 71 is supported from the rear of the inner casing 56 and, as previously described, the aperture in the inner casing 56 is closed by the flexible member 59 which is suitably formed of rubber or the like. Within the reservoir 71 and surrounding the member 59 is provided a head supporting member 72 which is of tubular form and which is constructed, for example, of "perspex". The supporting member 72 comprises a conic section and is open at its right-hand end, as shown in FIG. 12, to permit water to surround the flexible member 59. To this end, the member 72 may be formed with holes passing therethrough as indicated, for example, at 73.

By means of the supporting member 72 being formed of the generally conical shape shown in FIG. 12, the head can be supported at such an angle as to permit the investigation of the interior thereof along planes substantially parallel to the orbito-meatal line as shown at 74.

In the arrangement shown in FIG. 12, a cylindrical supporting member 75 is used instead of the member 72, and this permits the head to be tilted with respect to the apparatus so as to permit the investigation of the interior of the head to be carried out along planes skewed with respect to the orbito-meatal line. By this means, sections low on the back of the head can be investigated.

It will be appreciated from the foregoing that the aforementiond matrix of elements is disposed so as to be wholly within the water i.e., the matrix embraces only the body part and some of the water surrounding it. By this means, greater accuracy can be achieved in the derivation of the absorption (or transmission) coefficients of the elements of the matrix, as compared with an arrangement in which the body part is surrounded

What I claim is:

1. Apparatus utilizing penetrating radiation such as X- or γ-radiation to evaluate a variable absorption coefficient with respect to said radiation in a plane within a body, including a source of said radiation and detecting means for detecting a beam, radiated from said source, after passage through said body in said plane, said detecting means and said source on the one hand and said body on the other hand being relatively movable so that output signals can be obtained representing the absorption by said body of beams at a plurality of angularly and laterally spaced positions, and means for utilizing said output signals to effect said evaluation, said apparatus further comprising a scanning frame on which said source and said detecting means are mounted, facing each other across an aperture in which said body can be positioned so that said beams of radiation pass through said body in said plane, said source and said detecting means being mounted for orbital scanning movement about an axis normal to said plane and also for lateral scanning movement to cause said detecting means to pick up radiation successively from respective beam paths through the body which are disposed across the lateral extent of said body in said plane, and means for producing interrelated orbital and lateral scanning movements of said source and said detecting means in such a way that for each of a series of successive increments of said orbital movement a lateral scanning movement occurs from which there is derived a set of output signals corresponding to the absorption suffered by said radiation on traversing said beam paths, successive sets of such output signals being derived after said successive increments of orbital movement.

2. Apparatus according to claim 1 in which said source is arranged to produce a beam of small cross-sectional area and said detector is mounted so that it is always pointing towards said source, and said means for producing interrelated orbital and lateral scanning movements is arranged to move said source and said detector simultaneously along parallel paths to effect lateral scanning movements in intervals between successive increments of said orbital scanning movement.

3. Apparatus according to claim 1 wherein said means for producing interrelated orbital and lateral scanning movements includes means for effecting said orbital movement as a series of substantially equiangular steps.

4. Apparatus according to claim 3 wherein said means for producing interrelated orbital and lateral scanning movements includes means for effecting said lateral movement as a bidirectional reciprocating motion of predetermined magnitude and the said interrelationship is such that reversals in said lateral movement occur during the steps of said orbital movement.

5. Apparatus for examining a body by means of penetrating radiation such as X- or γ-radiation including a source of the radiation and detector means for detecting radiation from said source after it has traversed a linear path through a planar region of the body, scanning means for relatively moving the source and the detecting means on the one hand and the body on the other hand so that output signals can be obtained which indicate the degree of absorption suffered by said radiation on passing through said region of the body along a plurality of other linear paths laterally and/or angularly misaligned with the first mentioned linear path, wherein the source and detector means are mounted so as to face one another across an aperture adapted to receive the body, said scanning means including also means for causing said source and said detector means to move together to execute a lateral scan, in said plane, relative to the body and to orbit around the body in said plane, about an axis perpendicular to said plane, so that for each of a series of successive increments of said orbital movement a lateral scanning movement occurs from which there is derived a set of said output signals, successive sets of said output signals being derived from successive increments of said orbital movement, the apparatus further including signal processing means which includes a two-dimensional store representing said planar region of the body, the store having a matrix of mesh addresses, one for each element of the body in said region, and means for distributing to the linear group of mesh addresses corresponding to each of said linear paths through said region a value related to the respective output signal for the relevant path together with contributions derived from others of said output signals.

* * * * *